United States Patent

[11] 3,552,517

| [72] | Inventor | Donald L. Nordeen |
| | | Orchard Lake, Mich. |
| [21] | Appl. No. | 769,005 |
| [22] | Filed | Oct. 21, 1968 |
| [45] | Patented | Jan. 5, 1971 |
| [73] | Assignee | General Motors Corporation |
| | | Detroit, Mich. |
| | | a corporation of Delaware |

[54] VEHICLE POWER STEERING GEAR WITH LATERAL ACCELERATION FEEDBACK MEANS
6 Claims, 5 Drawing Figs.

[52] U.S. Cl. ................................................. 180/79.2,
91/375, 74/388
[51] Int. Cl. ................................................. B62d 5/06
[50] Field of Search.......................................... 180/79.2;
91/375(A); 74/388(PS)

[56] References Cited
UNITED STATES PATENTS

| 2,902,104 | 9/1959 | Schilling........................ | 180/79.2 |
| 3,022,772 | 2/1962 | Zeigler et al.................. | 91/375(A) |

*Primary Examiner*—A. Harry Levy
*Attorneys*—E. W. Christen, H. Furman and D. L. Ellis ABSTRACT: A vehicle power steering unit of the type including an output or pitman shaft, an hydraulic servomotor connected to the output shaft, an input steering shaft and a pair of relatively rotatable hydraulic control valve elements each connected to one of the input and output shafts further incorporates a lateral acceleration feedback arrangement including a pendulum rotatably mounted within the steering gear housing and provided with a portion forming a sun gear in one of two planetary gear sets which are interconnected for torque transmission between the input and output shafts of the steering unit. Input shaft rotation steering the vehicle out of a straight line path into a curve is transmitted through the planetary sets and operates under road load on the output shaft to move the pendulum from an equilibrium position thereby deriving an artificial road "feel" commensurate with the amount of movement of the valve elements from neutral relation under the input rotation. Followup of the servomotor transmits through the output shaft and the planetary sets to return the pendulum to equilibrium position and the valve elements to neutral relation. With the vehicle in the curve, lateral acceleration centrifugal forces experienced in the vehicle operate on the pendulum causing it to apply a reaction torque on the input shaft proportional to the vehicle lateral acceleration.

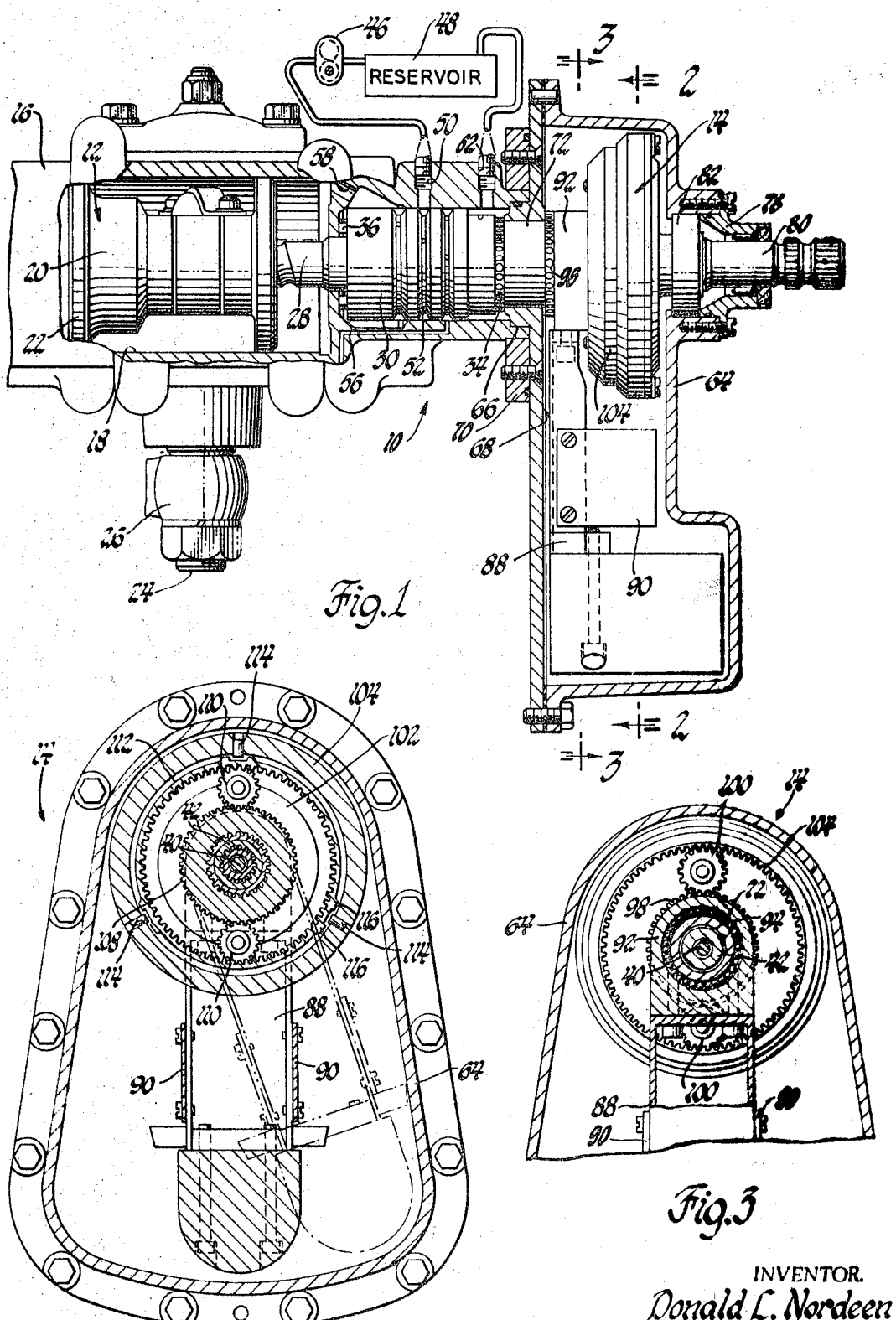

INVENTOR.
Donald L. Nordeen
BY
D. L. Ellis
ATTORNEY

VEHICLE POWER STEERING GEAR WITH LATERAL ACCELERATION FEEDBACK MEANS

This invention relates to automotive vehicle-steering gear and more particularly to an improved automotive vehicle-steering gear including means providing reaction or steering "feel" proportional to lateral acceleration forces experienced by the vehicle.

In the U.S. Pat. Nos. to Schilling 2,902,104 and Bidwell 2,904,120, issued Sept. 1, 1959 and Sept. 15, 1959, respectively, and both assigned to the assignee of present invention, disclosures are made of vehicle power steering mechanisms provided with systems operative to sense the lateral acceleration forces experienced by a vehicle in negotiating curved roadways and for informing the vehicle operator of the magnitude and direction of such forces. In such systems the operator is at all times provided with a reaction or "feel" at the steering handwheel directly proportional to the severity of the forces experienced in the motion of the vehicle which are ordinarily not otherwise truly reflected through conventional power steering mechanisms. These disclosed systems also operate to automatically recover the vehicle from skids or spins as on icy roadways. As indicated, these systems are particularly useful in improving the operation of conventional steering gears wherein, although some agency of artificial road feel is provided as by resilient centering springs between the hydraulic valve parts or other servocontrol elements of the gear, indicative of the amount of force applied by the servomotor, such centering means have been necessarily limited to force feedback or reaction through a range up to a maximum value which may not exceed an arbitrary comfortable reaction torque at the steering wheel acceptable to the vehicle operator when parking or in low-speed conditions wherein no substantial lateral acceleration forces are experienced.

The present invention provides improvement in this type of vehicle power steering mechanism particularly in the provision of a relatively simple and compact lateral acceleration feedback unit which may be incorporated within a conventional vehicle steering mechanism and including a lateral acceleration feedback mass mechanically coupled directly between the input and output elements of the steering gear unit for torque transmission therebetween.

A feature of the invention is in the use of a lateral acceleration feedback pendulum operatively connected between the input and output shafts of the vehicle-steering gear mechanism by means capable of transmitting torque experienced in the pendulum under lateral vehicle acceleration forces mechanically directly to the steering input shaft as a proportional reaction torque opposing the input rotation thereon causing deflection of the vehicle dirigible wheels.

A further feature of the invention resides in connecting such pendulum or other feedback mass between the input and output shafts of a vehicle power steering gear in such a way that lost motion input rotation thereon operative for control of the servomotor in an indicated direction is met with reaction or "feel" from the resistance of the pendulum to being moved from an equilibrium position by such input rotation.

Yet a further feature of the invention is in the use of planetary gear sets connected between the input and output shafts of the vehicle power steering mechanism and connected with the lateral acceleration feedback mass whereby lost motion input rotation at the input shaft against road load on the output shaft results in lost motion displacement of one of a pair of movable valve elements controlling the servomotor concurrently with a displacement of the feedback mass for the road "feel," the gearing being further operative during followup in the output shaft under operation of the servomotor to transfer with lost motion relative to the fixed input shaft a followup rotation returning the valve elements to a neutral relation and returning the feedback mass to an equilibrium position, and with any lateral vehicle acceleration forces on the feedback mass being transmitted through the gearing directly as a reaction torque to the input shaft informing the driver of the magnitude of such lateral acceleration forces.

These and other features and advantages of the invention will be readily apparent from the following specification and from the drawings wherein:

FIG. 1 is a longitudinal sectional view of a vehicle power steering gear mechanism incorporating lateral acceleration feedback means according to the invention;

FIG. 2 is a sectional view taken generally along the plane indicated by lines 2–2 of FIG. 1;

FIG. 3 is a sectional view taken generally along the plane indicated by the lines 3–3 of FIG. 1;

Figure 4:
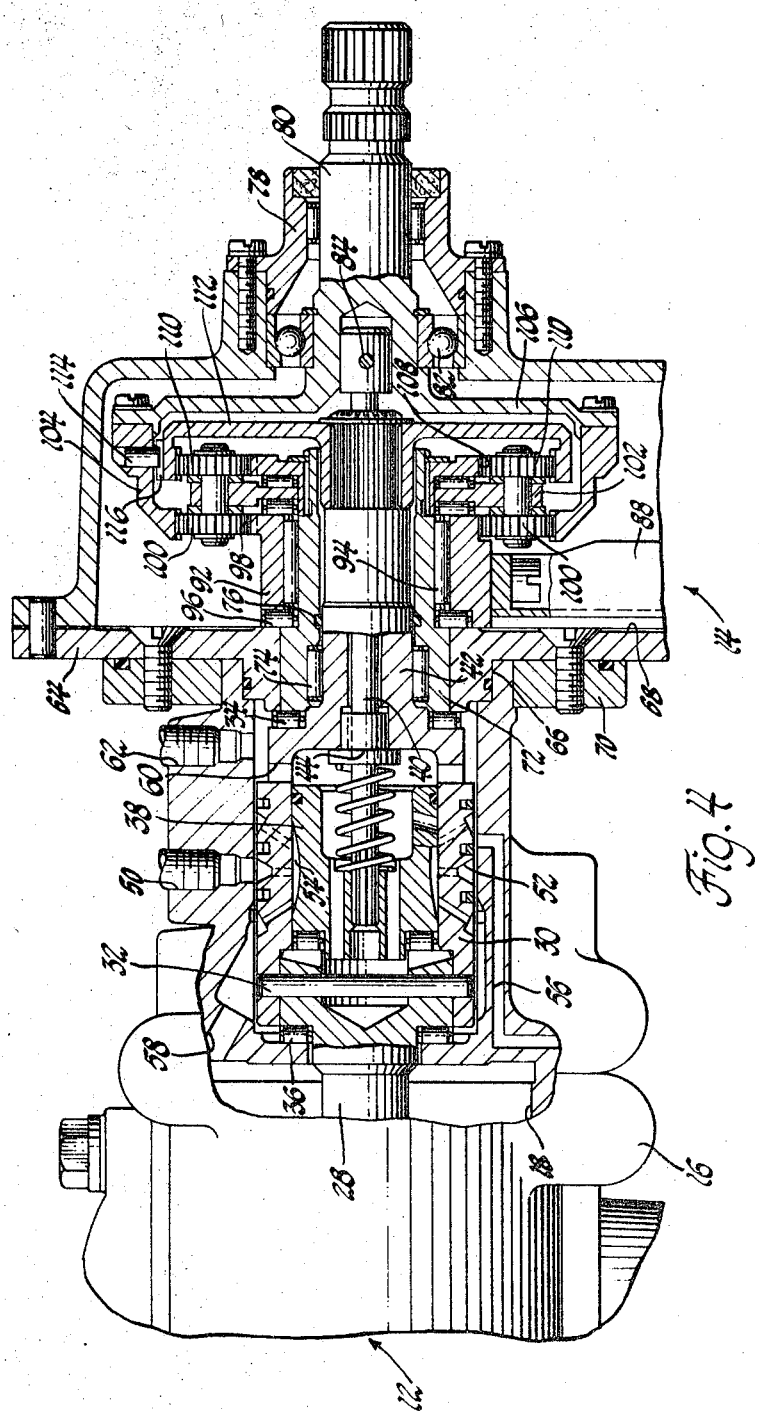
FIG. 4 is an enlarged sectional view of a portion of FIG. 1.

Referring now particularly to FIG. 1 of the drawings, there is shown therein a vehicle power steering gear mechanism incorporating the lateral acceleration feedback arrangement, the steering gear unit being designated generally as 10 and including an hydraulic power and reduction gear mechanism 12 and a lateral acceleration feedback mechanism 14. Dealing first with the power mechanism 12, the same will be recognized as of generally conventional construction identified as a so-called inline integral type of power steering gear including generally concentrically arranged power piston reduction gear and rotary control valve elements. In a common housing 16 for both the power piston reduction gear and valve elements, a cylinder 18 is provided receiving a ball nut piston 20 sealed at 22 to the cylinder wall to delineate at either side thereof a pair of fluid pressure chambers. While not shown herein, the ball nut piston 20 is conventionally provided at one side with a set of rack teeth or similar gear structure for connection with a sector arm of an output pitman shaft indicated at 24 journaled in the housing 16 on an axis generally crosswise the axis of the ball nut piston. Reciprocating movement of the ball nut piston 20 transmits as rotation in pitman shaft 24 to actuate the usual steering linkage to the vehicle dirigible wheels, including a pitman arm indicated at 26 connected on the exposed end of the pitman shaft.

As is further well known, the ball nut piston 16 conventionally includes recirculating ball connection with a screw or grooved worm shaft 28 received in a central bore of the ball nut piston and mounted at its other end on housing 16 in association with the rotary valve element.

For a more complete description of the operation and structural details of structure suitable to power mechanism 12, reference may be had to Zeigler et al. U.S. Pat. No. 3,022,772, issued Feb. 22, 1962. Generally, however, referring more specifically to FIG. 4, such structure may include in the rotary valve element thereof a valve sleeve 30 mounted rotatably within a central bore of housing 16 and connected for unitary rotation with an enlarged end of the screw 28 by a pin 32. Suitable roller bearing means are provided as at 34 and 36 on the housing as thrust carriers for the sleeve 30. Mounted for relative rotation within a central bore of the sleeve 30 is an inner valve element or spool 38 having nonrotatable splined or similar connection with an end of an input valve shaft 40 extending with clearance through a central bore of an end portion 42 of the sleeve 30 and into the feedback unit 14. Suitable bearing means may be provided at 44 insuring antifriction rotation between shaft 40 and the valve sleeve. Particular reference may be had here to the Zeigler et al. patent, but generally sleeve 30 and spool 38 are provided with suitable land and groove porting structure operative to selectively direct pressurized fluid to either of the pressure chambers delineated within the chamber 18 as supplied from a fluid pressure pump 46 drawing from a reservoir 48 and connected to an inlet port 50 in housing 16, all as seen best in FIG. 1. Pressurized fluid in port 50 communicates to a central annular groove 52 on the exterior of sleeve 30 and through radial ports therefrom to axially extending grooves 54 in the exterior of the spool 38. Depending upon the direction of relative rotation between the sleeve and spool, as will hereinafter be detailed, land structure on the internal periphery of the sleeve cooperates with such axial grooves 54 to direct such pressurized fluid through one of a pair of passages 56 and 58 to the respective side of the ball nut piston 20 causing reciprocation of the latter to actuate the pitman shaft 24. Concurrently, exhaust is permitted from the other power chamber through the other of passages 56 and 58 through suitable radial porting in spool 38 to a central cavity therein and thence to an exhaust port 60 in sleeve 30 and an exhaust port 62 in housing 16 connected with the reservoir 48.

Turning now to the feedback mechanism 14 of the steering unit 10, the same generally includes a housing 64 including at one side an annular shoulder 66 mated to an end bore in the housing 16 of the power mechanism 12, with screws being provided to fasten one wall portion 68 of housing 64 to a retaining ring 70 welded or otherwise fixed externally of the housing 16. Rigidly connected by welding or other suitable attachment to wall 68 is a sleevelike housing portion 72 supporting the end portion 42 of valve sleeve 30 by a roller bearing assembly 74 and sealed thereto at 76. Adjacent its other side, the housing 64 has a centrally bored hub sealed by a cap 78 rotatably mounting therewithin a steering input stub shaft 80 journaled on a roller bearing assembly and on a thrust ball bearing assembly 82. An enlarged end of the shaft 40 is pinned to the stub shaft 80 at 84. Such stub shaft 80 is of course adapted by splines or the like for driving connection with the usual steering shaft extending to the operator's handwheel in the passenger compartment.

Connected between stub shaft 80 and the end portion 42 of the sleeve 30 is a lateral acceleration feedback pendulum and double planetary gear set structure including a feedback pendulum 88 swingable in an enlarged portion of the housing 64 under a limited range as indicated in FIG. 2. The cavity of this housing 64 is preferably filled with oil or other substantially viscous liquid operative upon damping paddles 90 fixed to the arm of the pendulum. The hub 92 of the pendulum is mounted by roller bearing 94 over the fixed housing portion 72 and against a thrust roller bearing 96 seated on the housing 64.

As seen best in FIG. 3, hub 92 includes a toothed peripheral portion forming a first sun gear 98 meshing with a pair of first pinions 100 mounted on shafts extending from a carrier disc 102 received rotatably over the housing portion 72 and provided with a roller bearing seat on the hub 92. Pinions 100 further mesh with an internally toothed ring gear 104 fixed by screws or the like to a web 106 of stub shaft 80. Housing portion 72 is provided at its extremity with a second sun gear 108, seen best in FIG. 2, such sun gear being preferably formed as a separate piece splined to the housing portion and held by a snap ring therein. The second sun gear 108 meshes with a pair of second pinions 110 each respective to a pinion 100 by the common shaft, the pinions 110 being meshed with an internally toothed second ring gear 112 having its hub splined on the extremity of the end portion 42 of valve sleeve 30 and held by a snap ring thereover. Further roller bearing means are provided between the second gear and the carrier 102.

Referring to FIGS. 2 and 4, relative rotation limiting abutment structure is provided between the ring gears 104 and 112 in the form of a plurality of pins 114 mounted to the ring gear 104 and extending into recesses of predetermined circumferential length defined by spaced pairs of abutments 116 on the external surface of the ring gear 112. The pins are shown located in a central position between the opposed abutment pairs 116 obtaining in the neutral nonpressurizing relation of valve sleeve 30 and spool 38 and of ring gears 104 and 112.

Figure 5:
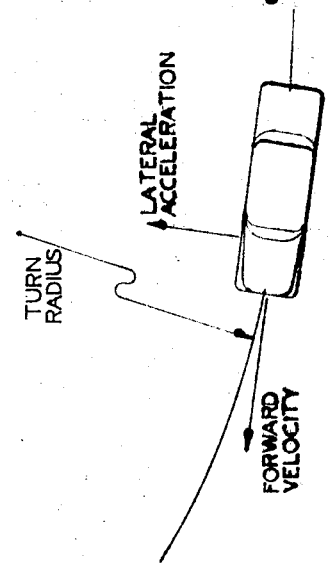
FIG. 5 is an illustration of conditions obtaining in a right turn of a vehicle on a curved roadway.

In operation of the steering gear unit 10, and assuming the vehicle to be travelling a straight line over the roadway and approaching a curve to the right as indicated in FIG. 5, input rotation on stub shaft 80 in a clockwise direction, as viewed in FIG. 2, to accomplish a right turn in the vehicle dirigible wheels rotates ring gear 112 clockwise. Assuming that sufficient resistance is present in the dirigible wheels and steering linkage requiring operation of the servo assist action of ball nut piston 20, such road resistance is transmitted through the ball nut piston, the screw 28 and the valve sleeve 30 and end portion 42 thereof to result in a grounding or holding of the ring gear 112. Since sun gear 108 is held fixed on housing 64, such grounding of the ring gear 112 results in a lockup of carrier 102 whereby the input rotation on ring gear 104 causes rotation of pinions 100 on the carrier shafts and consequent opposite rotation of the sun gear 98 of pendulum 88 causing a deflection or rotation in the latter in a counterclockwise direction as viewed in FIG. 2 toward the broken-line position thereof. Concurrently, such input rotation on the stub shaft is transferred through shaft 40 to the valve spool 38 rotating the latter from neutral relation with the valve 30 and to a position wherein substantial pressurization of a respective side of ball nut piston 20 results to power steer the vehicle into the right turn. "Feel" of this servomotor operation is provided in stub shaft 80 through ring gear 104 and pinions 100 by the resistance of pendulum 88 against movement from or the tendency toward its equilibrium position shown in solid lines in FIG. 2. The free tendency of the pendulum to such equilibrium position is of course controlled by suitable location and angular inclination of the steering gear mechanism 10 on a longitudinal axis of the vehicle and preferably with a minimum of angular disposition of its longitudinal axis from horizontal.

It should be here mentioned that the lost motion available between pins 114 and abutments 116 and hence the two ring gears is generally similar to that provided in the Zeigler et al. patent corresponding to the displacement between the valve sleeve 30 and spool 38 effecting complete hydraulic closure between the cooperating sets of lands and grooves therein for maximum pressurization in one or the other side of the servomotor. With proper operation of the power steering pump 46, etc., however, maximum angular displacement in the stub shaft 80 from neutral relation is normally held to a small value. For proper "feel" of such displacement of the valve elements, pendulum 88 has its mass suitably sized to provide for substantial resistance or energy requirement in moving from equilibrium position, the effect of such mass of course being modulated by the speed reduction between ring gear 104 and sun gear 98 thus further requiring suitable selection of the ratio therebetween.

Assuming now that the servomotor including ball nut piston 20, has been pressurized and displaced to a position deflecting the pitman shaft 24 and vehicle dirigible wheels sufficiently to negotiate the right hand turn in FIG. 2, and ignoring for the moment any forces required in the servomotor merely to hold such wheels in deflected position against the road load as may be occasioned by the wheel suspension geometry or the like, it is seen that such followup movement also obtains in screw 28 from its connection with the ball nut piston and such followup rotation in the screw transfers through the sleeve 30 to ring gear 112, manifested as clockwise rotation therein as viewed in FIG. 2. Such followup rotation in ring gear 112 causes advance of pinions 110 over the fixed sun gear 108 and consequent advance of carrier 102 in a clockwise direction, FIG. 3. Assuming further that the vehicle operator exerts sufficient force on the steering wheel to consider stub shaft 80 and ring gear 104 as grounded or substantially grounded or held, pinions 100 thus must also rotate but in a counterclockwise direction permitting a clockwise rotation of sun gear 98 and pendulum 88 back toward its equilibrium position shown in solid lines. Such equilibrium and consequent reduction of the reaction force or "feel" is of course not realized until complete followup of the valve sleeve 30 occurs with the screw 28. More specifically, whatever pressurization required on ball nut piston 20 to hold the vehicle dirigible wheels in deflected position will be effected by the driver through his holding of the displacement from neutral of stub shaft 80 and will be reflected in an incomplete followup in the valve sleeve 30 back to hydraulically neutral relation with the spool 38 and an incomplete return of the pendulum 88 to equilibrium, thereby maintaining its reaction or road "feel" in the stub shaft 80.

In cases of higher speed operation and relatively small steering angle sought in the dirigible wheels, it may be that the road load in such wheels is slight and little or no pressurization or servo action is required of ball nut piston 20 to accomplish the turn in aid of the operator's torque in stub shaft 80. The load or grounding torque on valve sleeve 30 and ring gear 112 is accordingly slight, and with sun gear 108 fixed and sun gear 98 substantially grounded by the resistance of pendulum 88 meeting whatever load does exist on ring gear 112, the input torque on ring gear 104 transmits through an orbiting of pinions 100 and 110 and carrier 102 over the sun gears to apply torque to ring gear 112, screw 28 and pitman shaft 24 to, in effect, essentially manually steer the vehicle into the turn without any substantial displacement from neutral between the valve parts causing servoaction in the ball nut piston.

With the vehicle in the right turn, as viewed in FIG. 2, it of course experiences a lateral acceleration inwardly to its center of turn accompanied by centrifugal force outwardly therefrom which is a function of the radius of the turn and the square of the velocity with which the vehicle negotiates the turn. This centrifugal force is in turn experienced by the mass of pendulum 88 and, as viewed in FIG. 2, with a right turn, results in a tendency of the pendulum to rotate clockwise. Thus, continuing the operational example, the ball nut piston is pressurized at one side thereof meeting the road load from the dirigible wheels such that the piston, screw 28, valve sleeve 30 and ring gear 112 are essentially locked with the fixed sun gear 108. The carrier 102 is accordingly locked and thus the clockwise tendency of the pendulum 88 is manifested through pinions 100 as a counterclockwise reaction torque in ring gear 104. The vehicle operator must accordingly exert an opposite or clockwise torque on his steering handwheel meeting this reaction torque merely to hold the parts in the established right turn position. It is of course seen that as the vehicle speed increases around a turn of given radius the centrifugal force on pendulum 88 increases requiring proportionally increased effort by the driver. Thus, the pendulum is properly informing him of the severity of the conditions the vehicle is undergoing in the turn. Were the operator to let go of his steering wheel, such tendency on the pendulum would be made free for clockwise rotation from the established power steer position causing a counterclockwise displacement of ring gear 104 and stub shaft 80, as viewed in FIG. 2, thereby to reduce or eliminate the clockwise right turn valve displacement in spool 38 relative to sleeve 30 to deenergize the servomotor whereby the road load on the dirigible wheels is permitted to return the same to a straight-ahead condition or, in the absence of such road load, to cause a left turn relative displacement in the valve elements causing a servoed left turn in the dirigible wheels back to straight-ahead condition. The absence of significant road load is perhaps best illustrated in a vehicle skid or spin on an icy roadway. In the case of a spin in a right turn direction, for example, the automatic leftward displacement of the vehicle dirigible wheels by the force on pendulum 88 meets what of course is usually required to correct the spin and the "hands off" stability advantages attending this operation are believed apparent.

In the event of failure of power steering pump 46, pins 114 and abutments 116 between the two ring gears 104 and 112 operate after the limited lost motion available therebetween to establish manual drive steering connection between stub shaft 80 and valve sleeve 30, which of course connects for direct drive through screw 28 to the ball nut piston and reduction gear to the pitman shaft. After the slight displacement of the pendulum and sun gear 28 attending the initial lost motion between the ring gears, conjoint rotation of such gears in either direction proceeds merely with an orbiting of the carrier 102 and the several pinions 100 and 110 with the ring gears about the sun gears 98 and 108.

A condition of left turn steer in steering mechanism 10 is believed readily apparent from the foregoing description of the right turn condition. The left turn relative rotation of the ring gears 104 relative to ring gear 112 in the opposite or counterclockwise direction, as viewed in FIG. 2, of course proceeds under substantial road load with displacement of the valve parts from neutral for a power left turn pressurization on ball nut piston 20 concurrently with a clockwise rotation of pendulum 88 from equilibrium for road "feel" in the stub shaft 80. The centrifugal force experienced by the pendulum in a left turn tending it counterclockwise is experienced as a clockwise reaction torque in the input shaft which must be counteracted by increased left turn effort at the operator's steering wheel.

I claim:

1. In vehicle-steering mechanism, a steering input shaft, an output shaft adapted for connection with the dirigible wheels of the vehicle, and means drivingly connecting said shafts for torque transmission therebetween including a lateral vehicle acceleration feedback mass operative under centrifugal force thereon to apply reaction torque to said input shaft proportional to the lateral acceleration experienced by the vehicle.

2. In vehicle power steering mechanism, a steering input shaft, a lateral acceleration feedback pendulum, means drivingly connecting said input shaft with said pendulum for torque transmission therebetween such that input rotation on said shaft at all times is met with the resistance of said pendulum to movement from an equilibrium position to provide road feel within said shaft, said connecting means being operative to apply lateral vehicle acceleration forces experienced by said pendulum as a reaction torque to said shaft.

3. In vehicle power steering mechanism, a steering input shaft, an output shaft, a fluid-operated servomotor connected with said output shaft, a pair of relatively movable valve elements, one of said elements being connected with said output shaft and the other of said elements being connected with said input shaft whereby input rotation on said input shaft moving said other valve element from a neutral relation with said one valve element and said output shaft causes operation of said servomotor, lateral acceleration feedback and valve centering means normally located in an equilibrium position, and means operatively connecting said lateral acceleration feedback and valve-centering means between said valve elements such that input rotation on said input shaft moving said valve elements from neutral relation at all times deflects said lateral acceleration feedback and valve centering means from equilibrium position providing road feel to said input shaft and further such that followup movement in said output shaft under operation of said servomotor returns said lateral acceleration feedback and valve-centering means to said equilibrium position, said connecting means being operative to apply lateral vehicle acceleration forces experienced by said lateral acceleration feedback and valve centering means as a reaction torque to said input shaft.

4. The combination recited in claim 3 wherein said connecting means includes means limiting relative rotation between said input and output shafts for establishing driving connection therebetween operative in the event of power failure in said servomotor.

5. In vehicle power steering mechanism, a steering input shaft, an output shaft, a fluid operated servomotor connected with said output shaft, a pair of relatively movable valve elements, one of said elements being connected with said output shaft and the other of said elements being connected with said input shaft whereby input rotation on the latter moving said other valve element from a neutral relation with said one valve element and said output shaft causes operation of said servomotor, a lateral acceleration feedback and valve-centering pendulum normally located in an equilibrium position, and planetary gear means operatively connecting said input shaft, said output shaft and said pendulum including input gear means connected with said input shaft and output gear means connected with said output shaft, said input gear means under input rotation on said input shaft being operable in lost motion relative to said output gear means with road load on the latter to deflect said pendulum from its equilibrium position concurrently with movement of said other valve element from neutral relation to provide road feel in said input shaft, said output gear means under followup rotation of said output shaft caused by operation of said servomotor being operable in lost motion relative to said input gear means with load on the latter to return said pendulum to equilibrium position concurrently with followup of said one valve element to neutral relation, said planetary gear means being operative to apply lateral vehicle acceleration forces experienced by said pendulum as a reaction torque to said input shaft.

6. In vehicle power steering mechanism: support housing means; an input shaft rotatably mounted within said housing means; an output shaft rotatably mounted within said housing means and adapted for connection with the vehicle dirigible wheels; an hydraulic servomotor operatively connected with said output shaft; a pair of relatively rotatable valve elements mounted within said housing, one of said elements being connected for rotation with said output shaft and the other of said elements being connected for rotation with said input shaft whereby input rotation on said input shaft moving said other valve elements from a neutral relation with said one valve element and said output shaft serves for operation of said servomotor; a lateral vehicle acceleration feedback pendulum rotatably mounted on said housing means and normally located in an equilibrium position with respect thereto; and a double planetary gear torque transmission connection including a first sun gear connected with said pendulum, a first ring gear connected with said input shaft and cooperative as a set with said first sun gear, a second sun gear fixed on said housing means, a second ring gear connected with said output shaft and said one valve element and cooperative as a set with said second sun gear, carrier means rotatably mounted on said housing means and carrying a plurality of pinion gear pairs each including a pinion gear respective to each of said first and second sun and ring gear sets, said double planetary gear connection being operative under input rotation on said input shaft against road load on said output shaft to cause relative movement of said valve elements from said neutral relation thereof for operation of said servomotor concurrently with deflection of said pendulum from said equilibrium position thereof providing road feel in said input shaft, followup rotation of said output shaft under operation of said servomotor causing said double planetary gear connection to return said valve elements to neutral relation and to return said pendulum to equilibrium position, said planetary gear connection being further operative to apply lateral vehicle acceleration forces experienced by said pendulum as a reaction torque to said input shaft.